(12) United States Patent
Colbert

(10) Patent No.: US 7,621,662 B1
(45) Date of Patent: Nov. 24, 2009

(54) DEVICE AND SYSTEM FOR EMERGENCY VEHICLE LIGHTING

(76) Inventor: Terry Thomas Colbert, 22871 SW. Kathy St., Sherwood, OR (US) 97140

(*) Notice: Subject to any disclaimer, the term of this patent is extended or adjusted under 35 U.S.C. 154(b) by 0 days.

(21) Appl. No.: 11/500,134

(22) Filed: Aug. 7, 2006

(51) Int. Cl.
*B60Q 1/26* (2006.01)
(52) U.S. Cl. .................. 362/493; 362/479; 362/496; 362/542; 362/545
(58) Field of Classification Search .......... 362/479, 362/493, 496, 542, 545
See application file for complete search history.

(56) References Cited

U.S. PATENT DOCUMENTS

| | | | |
|---|---|---|---|
| 5,567,036 A * | 10/1996 | Theobald et al. | 362/485 |
| 6,619,824 B1 * | 9/2003 | Hou | 362/501 |
| 6,719,446 B2 * | 4/2004 | Cao | 362/547 |
| 6,848,819 B1 * | 2/2005 | Arndt et al. | 362/545 |
| 7,220,032 B2 * | 5/2007 | Mori | 362/541 |
| 2002/0191396 A1 * | 12/2002 | Reiff et al. | 362/246 |
| 2003/0025608 A1 * | 2/2003 | Pederson | 340/815.45 |
| 2005/0018441 A1 * | 1/2005 | Menke et al. | 362/493 |

* cited by examiner

*Primary Examiner*—Sharon E Payne
*Assistant Examiner*—Mary Zettl
(74) *Attorney, Agent, or Firm*—Mark S. Hubert

(57) ABSTRACT

The present invention is a system of emergency vehicle lighting that uses a low profile hood/trunk mounted LED plate unit and a door mounted LED strip unit. It is designed for both stand alone operation or for integration into an emergency vehicle's electronic alarm notification sequencing unit. The hood/trunk LED plate unit has a thin, enhanced geometrical configuration and an LED lens design that allows the light emitted from the superbright LEDs to be seen to a much higher degree to vehicles approaching from direction normal to the longitudinal centerline of the emergency vehicle. Mounting of the LED plate unit and LED strip unit can be permanent or temporary and because of the light weight, numerous chemical, magnetic and mechanical methods of affixation may be utilized.

8 Claims, 7 Drawing Sheets

DEVICE AND SYSTEM FOR EMERGENCY VEHICLE LIGHTING

BACKGROUND OF THE INVENTION

The present invention relates to a lighting system that can be removably affixed to an emergency vehicle to enhance the visibility of the emergency vehicle from all angles and from a distance that allows ample time for corrective action on the part of approaching drivers. More particularly, to a inexpensive exterior lighting system that can be easily integrated into the vehicle's electrical system or electronic alert sequencing unit and attached to exterior locations about the emergency vehicle such as the door or hood.

Most conventional emergency vehicles today have a variable audible alert, sequenced flashing head/tail/side light assemblies and a roof mounted light bar containing at least one light source designed to disburse light in 360 degrees. These lights may be solid, stroboscopic, revolving, flashing, modulated, pulsing, oscillating, alternating or any combination thereof. While in most situations any of the aforementioned devices will adequately alert a passerby of the presence of the emergency vehicle, there are crucial situations in which this is not the case. Specifically, when an emergency vehicle must enter into an intersection at the junction of more than one road, problems arise.

When exigent circumstances exist, the emergency vehicle often has to traverse the intersection against the prevailing traffic light. While those vehicles approaching approximately head on with the emergency vehicle receive the benefit of all of the emergency vehicle's alert devices, objects such as trees, bushes, other vehicles, or knolls often obstruct the view that vehicles approaching at acute angles have. Additionally, vehicles approaching the emergency vehicle at right angles (broadside) are already disadvantaged because they do not have the benefit of a visual line of sight with the emergency vehicle's front flashing lights as well as much of the roof mounted light bar alerts. Protocol is for the emergency vehicle to slowly creep into the intersection with the alert devices enabled. Herein lies the problem. The conventional system is not visible to the driver approaching at right angles until the center of the emergency vehicle is out into the middle of the intersection. At this time if the approaching vehicle is moving too fast to stop the emergency vehicle gets struck broadside and at the approximate center of the vehicle.

A similar problem arises when the emergency vehicle must be left unattended in an intersection, as is often the case at intersection accidents or where access to a road must be physically blocked from use by the emergency vehicle. Vehicles approaching the emergency vehicle at right angles are at the greatest danger of colliding with the emergency vehicle.

The present invention is a system of emergency vehicle lighting that uses a hood/trunk mounted LED assembly and a door mounted LED strip. The hood/trunk LED assembly has an enhanced three dimensional geometrical configuration that allows the light emitted from the LEDs to be seen from an approximate 135 degree horizontal viewing angle from either side of the longitudinal centerline of the emergency vehicle (270 degree total field of horizontal view) and a vertical field of view that encompasses all possible situations.

Henceforth, an emergency vehicle lighting device and system would fulfill a long felt need in the emergency vehicle industry. This new invention utilizes and combines known and new technologies in a unique and novel configuration to overcome the aforementioned problems and accomplish this.

SUMMARY OF THE INVENTION

The general purpose of the present invention, which will be described subsequently in greater detail, is to provide a lighting system for an emergency vehicle that is able to enhance the visibility of the emergency vehicle especially to those people in vehicles approaching the emergency vehicle at right angles.

It has many of the advantages mentioned heretofore and many novel features that result in a new configuration of a vehicular lighting system which is not anticipated, rendered obvious, suggested, or even implied by any of the prior art, either alone or in any combination thereof.

In accordance with the invention, an object of the present invention is to provide an improved vehicular external lighting system capable of operating with a low current draw and able to be simply integrated into an existing vehicle's electrical system or electronic alarm sequencer system.

It is another object of this invention to provide an improved emergency vehicle external lighting system capable of providing enhanced visual notification to drivers of vehicles approaching the emergency vehicle normally with respect to either side of the longitudinal centerline of the emergency vehicle.

It is a further object of this invention to provide a low cost, light weight, vehicular external lighting system that can be temporarily or permanently mounted on a vehicle and is not subject to mechanical failure that will affect the multi directional visibility.

It is still a further object of this invention to provide for a low profile, high visibility light emitting visual notification system that when not in use has a barely perceptible configuration as affixed to a vehicle.

It is yet a further object of this invention to provide an enhanced vehicular alert lighting system that has a three dimensional geometrical configuration that allows the light emitted to be seen from an approximate 135 degree horizontal viewing angle from either side of the longitudinal centerline of the emergency vehicle, and to be seen in vertical field of view that encompasses all possible situations.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements. Other objects, features and aspects of the present invention are discussed in greater detail below.

DETAILED DESCRIPTION

Figure 1:
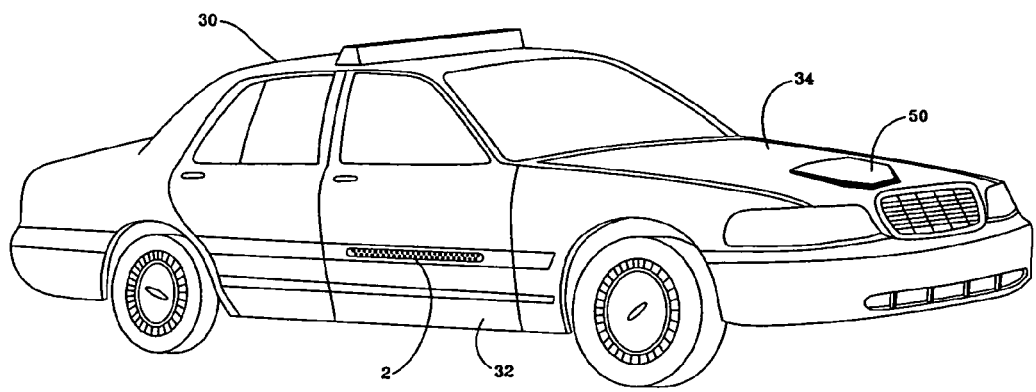
FIG. 1 is perspective view of an emergency vehicle with a hood mounted LED assembly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

The following system for emergency vehicle lighting entails the simultaneous use of at least one of each of the hood mounted light emitting diode (LED) assemblies and the door mounted LED strips although use of either of these alone could be sufficient to accomplish the task of enhancing the visibility of the emergency vehicle to approaching vehicles.

Light emitting diodes were chosen because their light output can be varied, they have a long life cycle and low power draw, they are inexpensive and diminutive in size so that a plethora of diodes may be used in a small space enabling multiple redundancy, they are lightweight and most importantly they have a low RF electromagnetic emission thereby minimizing radio distortion. This lack of radio distortion is a critical requirement of police and emergency vehicles. Further, LEDS are available in various colors with intensities that can be varied. This allows the use of clear lenses rather than colored lenses on the devices. Thus in the event of a shattered lens the specific alert color will not be lost. (I.E. This depends upon the type of emergency vehicle i.e. red for police, yellow, amber for road crews etc.)

FIG. 1 illustrates a police vehicle 30 with a LED strip 2 mounted on the vehicle's door 32 and a LED assembly 50 mounted on the vehicle's hood 34.

Figure 2:
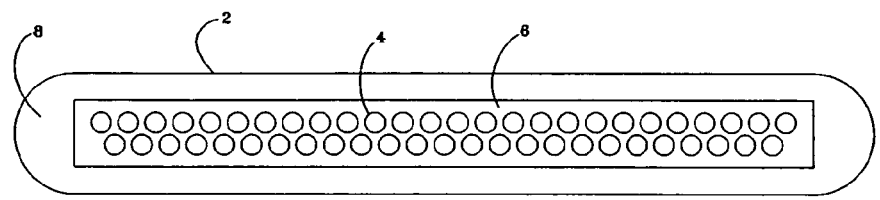
FIG. 2 is a front side view of the door mounted LED strip.

FIG. 2 illustrates a front view of the LED strip 2 showing two linear arrays of light emitting diodes (LEDS) 4 mounted directly onto LED strip circuit board 6 which is mechanically affixed directly above a linear base 8. The lens top cover cannot be seen from this view.

Figure 3:
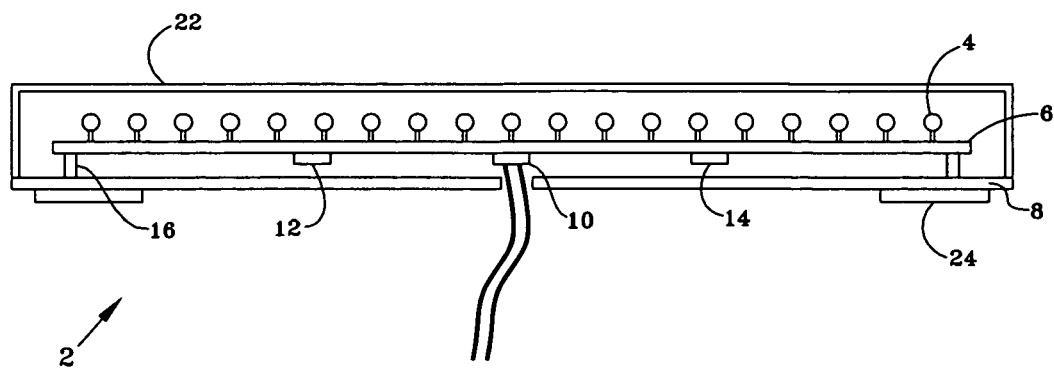
FIG. 3 is a longitudinal cross sectional view of the door mounted LED strip showing the general arrangement of all components.

Looking at FIG. 3, a longitudinal cross sectional view of the door mounted LED strip showing the general arrangement of all components, it can be seen that circuit board 6 has an array of LEDS 4 mounted on it's top surface 9 and in electrical connection with electrical connector 10 which is affixed on the bottom surface 11 of circuit board 6. The circuit board 6 has standoff spacers 16 between it's bottom surface 11 and base 8 so as to maintain their generally parallel spacial relationship and provide an adequate spacing between circuit board 6 and base 8 for electrical component clearance and heat dissipation. Diffusing lens top cover 18 mechanically attaches to linear base 8 so as to encapsulate the circuit board 6. There are small concave formations 20 on the inner surface of the lens top cover 18. These formations 20 act in the reverse of a culminator and serve to diffuse and refract the emitted light out into a wide array of directions thereby enhancing the viewing angle of the LED strip 2. There are orifices 23 formed through the base 8 through which electrical wires and mechanical fasteners 26 pass to facilitate mounting of the LED strip to the vehicle's door, quarter panels or pillars.

Figure 4:
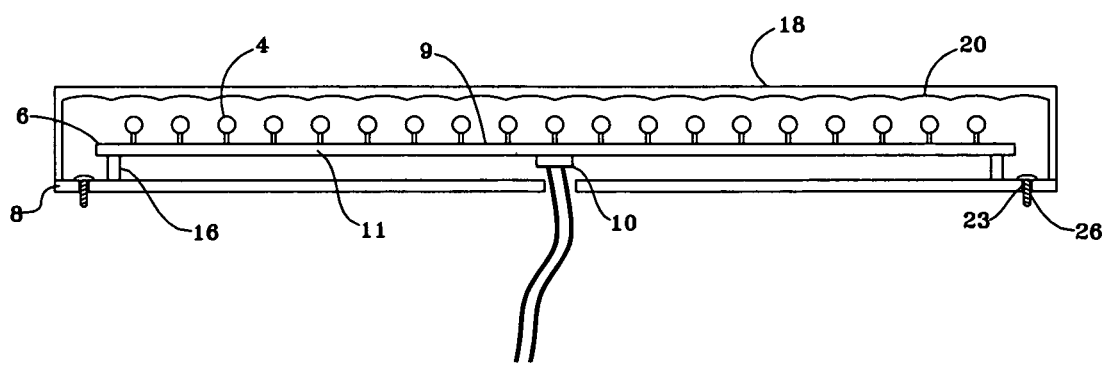
FIG. 4 is a longitudinal cross sectional view of the door mounted LED strip with internal microprocessor showing the general arrangement of all components.
Figure 5:
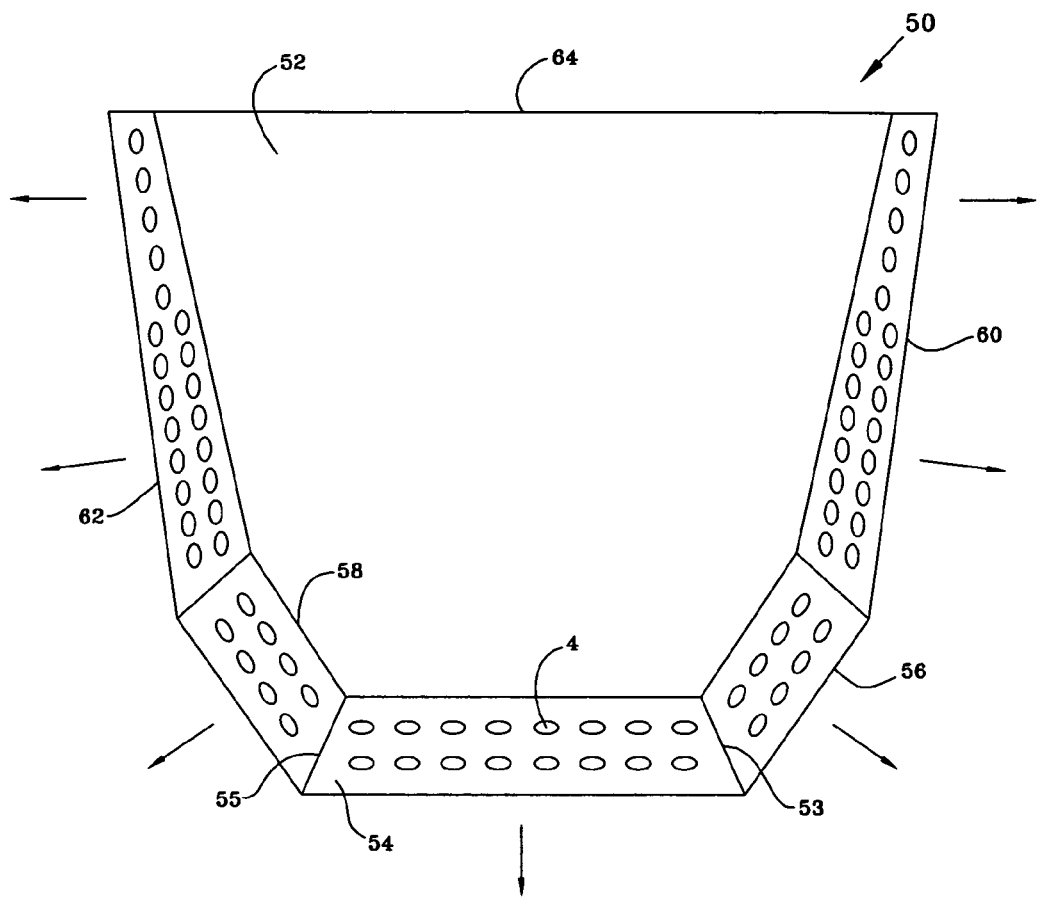
FIG. 5 is a top view of the hood mounted LED assembly illustrating the directions of illumination.

Looking at FIG. 4, a longitudinal cross sectional view of an alternate embodiment of the door mounted LED strip, it can be seen that circuit board 6 has a first microprocessor 12 and first current limiting resistor 14 which also is affixed on the bottom surface of circuit board 6 and in electrical connection with the power connector 10 and LEDS 4. This alternate embodiment differs principally by the elimination of the first microprocessor 12 and by the location of the limiting resistor at a place other than on the circuit board 6. The first microprocessor 12 is required only to give non-static visual effects to the LEDS 4 such as pulsing, sequenced stroboscopic movement, etc. Such would be the simplest case where the LEDS 4 were only turned on or off. Also, the top cover lens 18 is not smooth and has concave formations on it's inside surface. In the preferred embodiment mounting devices 24 project from the bottom side of base 8 these may be magnetic or adhesive strips, or resilient reinforcement strips with orifices there through to accommodate mechanical fasteners. In the alternate embodiment, direct mechanical attachment is via screw fasteners 26 that pass through screw orifices 23. As is well known in the field, any combination of lens type, mounting methods and electric configuration may be used to form other alternate embodiments as would be required to meet the specific situation. The approximate dimensions of the LED strip 2 for use on a conventional 4 door police sedan is 2 inches wide, 12 inches long and ½ to 3 inches deep. The nominal depth is approximately 1 inch but varies depending upon the location of the limiting resistor 14 and microprocessor 12 as well as the lens cover 18 configuration and electrical connector 10 used.

FIGS. 5, 6, 7 and 8 showing a top, front, side and side cross sectional view of a hood mounted LED assembly 50, when viewed together illustrate that LED assembly 50 is formed from the connection of five LED encrusted circuit boards angled at approximately 40 degrees (+/−20 degrees) with respect to the horizontal plane and secured into an eight sided, irregular, octahedron, three dimensional, geometrical configuration by top plate 52, bottom plate 66 and rear plate 64. It is to be noted that top plate 52 and bottom plate 66 have a two dimensional planar configuration as irregular, nonequilateral, nonequiangular, convex hexagons. The top plate 52 and bottom plate 66 have congruent corresponding contained angles but not congruent corresponding side lengths. The bottom plate 66 is simply a larger version of the top plate 52 wherein all interior angles and ratio of side lengths remain identical with those of the top plate. However the side lengths in the bottom plate 66 are larger than those of the top plate 52. It is this difference that allows the angled placement of the LED circuit boards. This angled design of the circuit boards increases the vertical visibility of the assembly.

It is to be noted that because most car hoods are not truly flat, bottom plate 66 has a slight concavity in both two dimensional planar directions, front to back and side to side. This enables a more aesthetic appearance when installed. Lens cover 70 serves to diffuse the emitted light and seal the assembly from the elements and moisture. It may be clear or colored.

Front circuit board 54 is attached at proximate end 53 to right short circuit board 56 and at distal end 55 to left front circuit board 58. Right long circuit board 60 is joined to right short circuit board 56. Left long circuit board 62 is joined to left short circuit board 58. Rear plate 64 is connected to right long circuit board 60 and left long circuit board 62. Second mounting strips 68 are affixed to bottom plate 66. Similar to LED strip 2 these strips 68 be magnetic or adhesive strips, or resilient reinforcement strips with orifices there through to accommodate mechanical fasteners.

Figure 6:
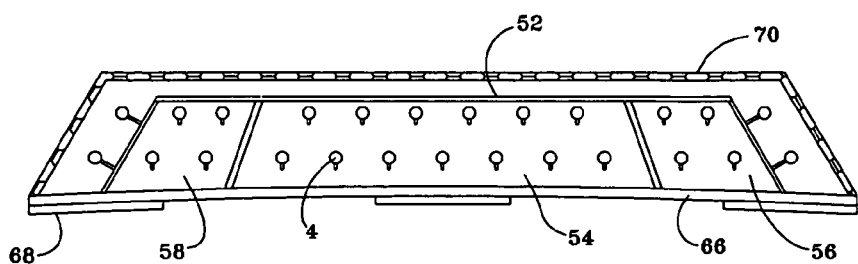
FIG. 6 is a front view of the hood mounted LED assembly.
Figure 7:
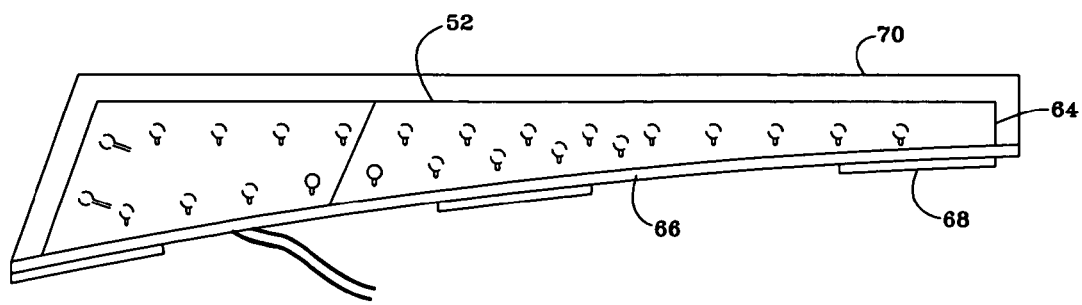
FIG. 7 is a side view of the hood mounted LED assembly.
Figure 8:
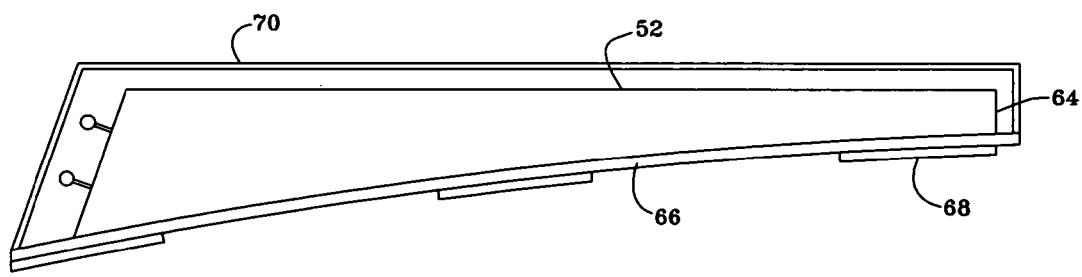
FIG. 8 is a vertical cross section view of the hood mounted LED assembly.

Looking at FIGS. 6 and 7 the angled disposition of the circuit boards with respect to the top plate 52 and bottom plate 66 can best be seen. Experimentation has shown that for the optimal vertical visibility, the contained angle between the bottom plate 66 and all circuit boards should be approximately 40 degrees (+/−20 degrees).

Figure 9:
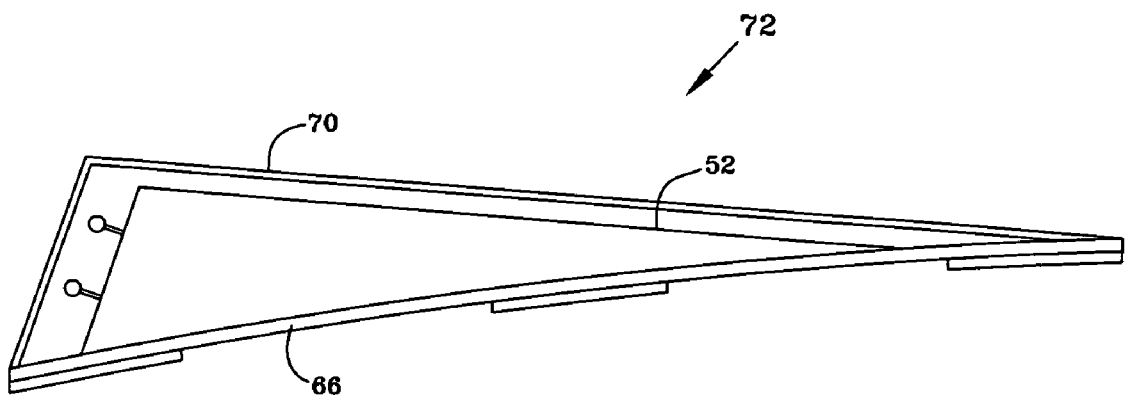
FIG. 9 is a vertical cross section view of the alternate embodiment hood mounted LED assembly.

Although in the preferred embodiment right long circuit board 60 and left long circuit board 62 have a quadrilateral planar geometry, in an alternate embodiment as shown in FIG. 9, the geometry of these two circuit boards is triangular, thereby eliminating the need for rear plate 64. In this alternate configuration top plate 52 would be joined along it's rear side to bottom plate 66 and the three dimensional geometric shape formed by the connection of by top plate 52, bottom plate 66 and the circuit boards would be a seven sided, irregular heptahedron. This forms a sleek, wedge like configuration. The approximate dimensions of the LED assembly 50 for use on a conventional four door police sedan is 12 inches wide, 12 inches long and a depth that may vary from 1/16 inches up to 3 inches deep.

Figure 10:
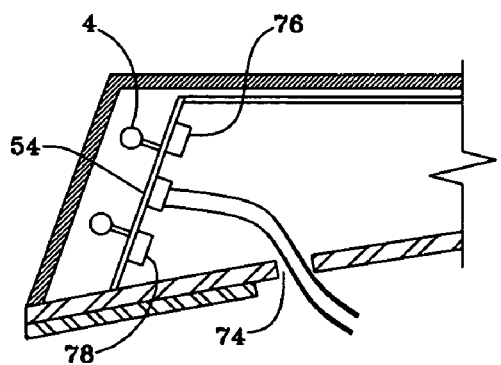
FIG. 10 is a partial cutaway of a vertical cross section view of the hood mounted LED assembly showing the microprocessor and current limiting resistor.

FIG. 10, a partial cutaway of a cross sectional side view illustrates a second current limiting resistor 76 and a second microprocessor 78 on the front circuit board 54.

Figure 11:
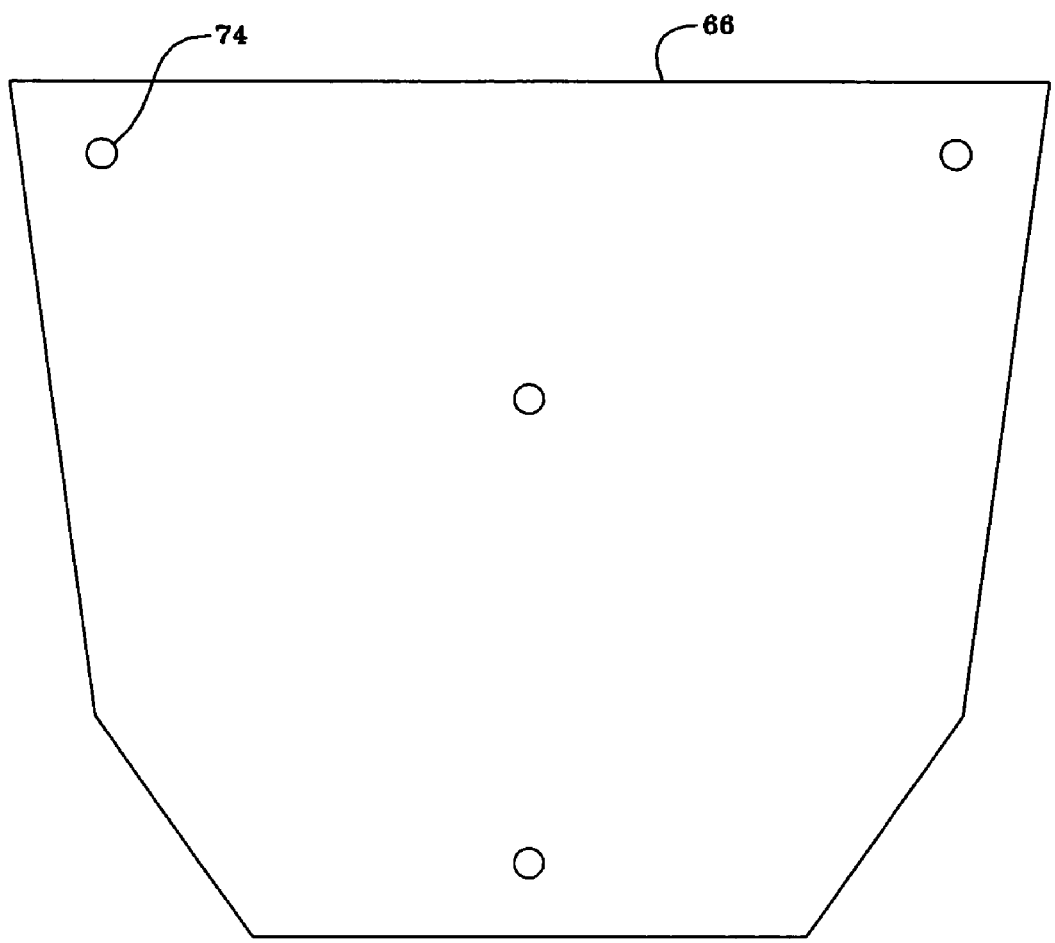
FIG. 11 is a bottom view of the hood mounted LED assembly.

FIG. 11 shows the location of typical mounting orifices 74 drilled through bottom plate 66 and Second mounting strips 68 so as to allow for the passing of mechanical fasteners and electrical wires.

It is to be noted that current limiting resistors must be used with LEDS so as to allow the LEDS to be powered with a current not to exceed a specific limit. These limiting resistors may incorporated onto the circuit board in some embodiments or into a remote location such as the vehicle's electrical alarm sequencing unit. These resistors may even be incorporated into the connector wires. The current and voltage in an LED are not linearly related and a change in voltage will not produce a proportional change in current. LEDs are semiconductors, or specifically, diodes wherein the current flowing in the LED is an exponential function of voltage across the LED. Because of this, a small change in voltage can produce a huge change in current and can damage the LED. A typical LED rating is 3.3V@20 mA and most LEDs reach peak brightness at a drive current of 20 mA. Powering a LED at a higher current will not produce substantial additional light but rather will cause the junction to dissipate the excess power as heat. Heating the junction will decrease the LED's useful life, and can reduce the output of the LED substantially. Heating it enough will cause catastrophic failure (producing a dark emitting diode). There are two rows of LED lights used on all or part of each of the five circuit boards, as experimentation has shown that this can produce the level of visual display required with a minimal current draw on the vehicle's electrical system. Depending upon the level of visual intensity desired more or less lights could be used as is well known in the art.

Although not necessary for operation, the microprocessor accomplishes selective illumination of individual or multiple LEDs to provide a plethora of visual effects. The processor may also adjust the power to the LED so as to change the LED's intensity for glowing effects. Without the use of a microprocessor the LEDS would be controlled to be on or off. Similar to the limiting resistors, the microprocessor may be remotely located, typically incorporated into the vehicle's electric alarm sequencer unit, although it would be the norm to have the microprocessor installed directly onto one of the circuit boards.

Figure 12:
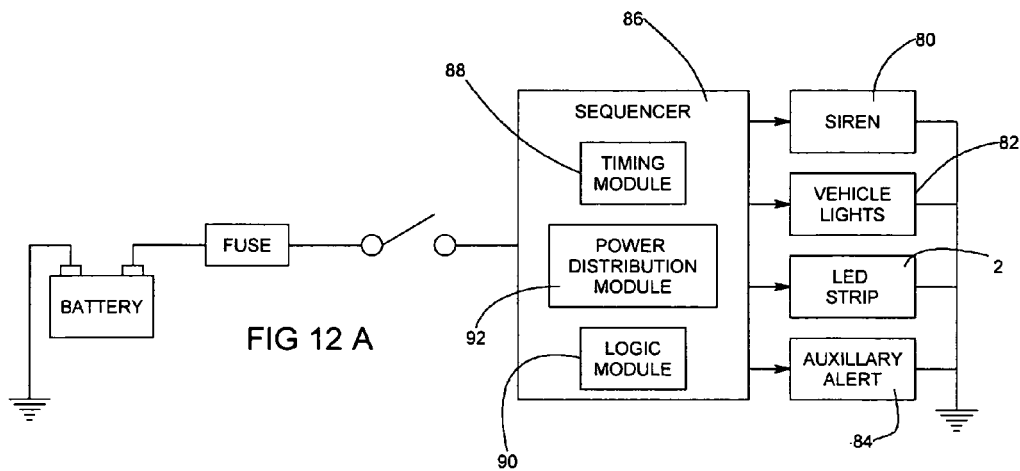
FIG. 12A illustrates the electrical circuit logic when the hood mounted LED assembly is used in conjunction with the vehicles existing sequencing unit.
FIG. 12B illustrates the electrical circuit logic when the hood mounted LED assembly with microprocessor is used as a stand alone unit.
Figure 12:
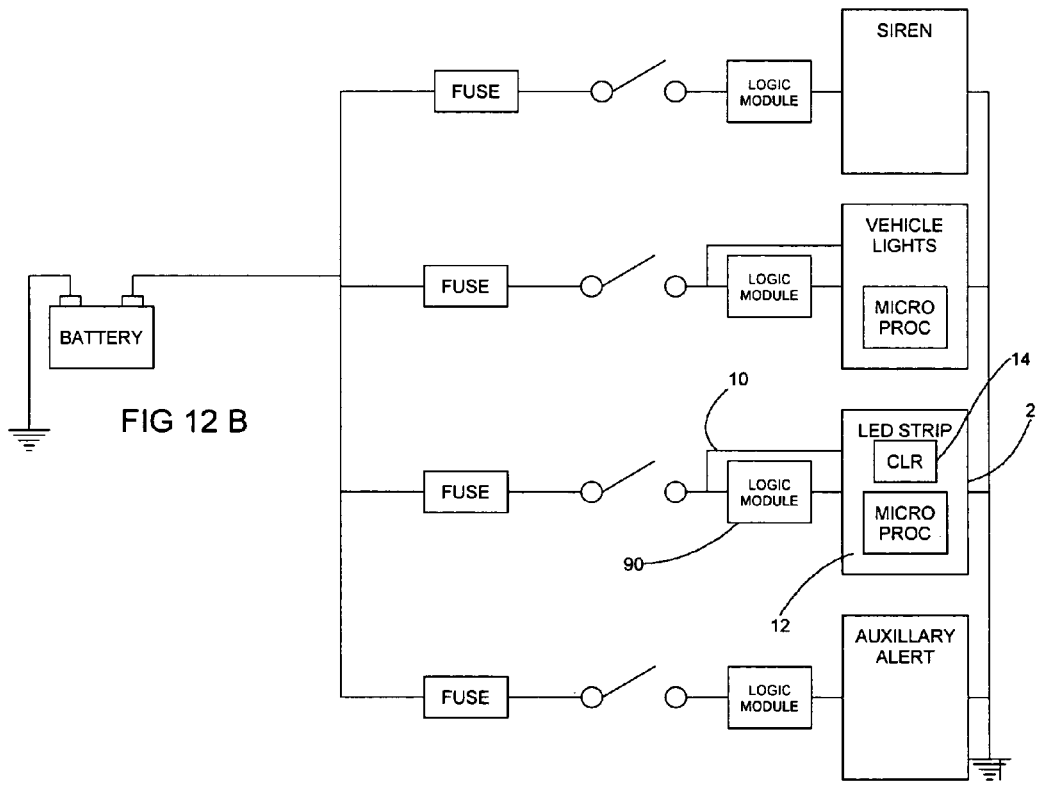

FIGS. 12A and 12B illustrate different methods of electrical operation of the hood mounted LED assembly and the strip LED. Basically, a manually operated logic module (which in a base unit could be as simple as an on/off switch) sends a signal to the microprocessor which switches on, switches off, or adjusts the electrical power to the LED strip or LED assembly individual LEDS in conjunction with the limiting resistor to accomplish the desired intensity and duration of illumination to achieve the desired visual effect. The logic module wiring may or may not also transmit the system power to the LED assembly and the strip LED. System power may be transmitted to the LED assembly and the strip LED by a separate electrical wire/s.

FIG. 12A shows how the system components typically would integrate with an existing sequencer unit of an emergency vehicle. Here, all vehicle alerts such as siren 80, vehicle lights 82 and auxiliary lights 84 are controlled by one master sequencer 86 located centrally within the vehicle. This sequencer 86 may incorporate a general timing module 88 that operates the integrated individual logic modules 90 for each alert either individually or in unison with another logic module to obtain a unique vehicle alert effect. The power distribution module 92 transmits power to the alerts and may or may not incorporate the current limiting resistance necessary for LED operation.

FIG. 12B shows a typical stand alone operation of the system components in the absence of a vehicle sequencer unit. Power is supplied to both the LED strip 2 (and the LED assembly 50) and the associated logic module 90. The logic module 90 for the LED strip 2 is manipulated by the vehicle operator to send a selected signal to the LED strip's microprocessor 12 (or the LED assembly's microprocessor 76). In this example the microprocessor 12 and current limiting resistors 14 are mounted directly on the circuit boards of the LED strip 2 or LED assembly 50. Power is also provided to the LED strip through the electrical connector 10. The microprocessor manipulates and delivers this power to the LEDS according to it's preprogrammed instructions according to the logic provided by the logic module 90. This graves the desired visual effect to the LED unit 2. As can be seen a microprocessor is not necessary for all alerts.

In usage, the emergency vehicle operator pilots the vehicle to its desired location and switches on the LED strip 2 or LED assembly 50 to obtain the desired visual indication through the individual logic module 90 for the LED strip 2 or LED assembly 50, or through the vehicle's existing sequencer unit 86 into which the logic module 90 for the LED strip 2 or LED assembly 50 has been integrated.

As can be seen there are several interchangeable methods of mounting or lens configurations between the embodiments. The number of linear arrays may vary, limited mainly by the power capacity of the vehicle, however, testing has shown that two linear arrays provide an adequate visual alert.

Although not illustrated, culminator cups or reflective plates may be placed about the LED arrays to project their emitted light in a more forwardly direction. Additional elements or configurations of existing elements used to enhance the emitted light or increase the strength of the units are well known in the art. Such elements include but are not restricted to parabolic reflectors, silicate glass lens covers, inverted parabolic lens covers, and rubber seals. Similarly, there are different electrical configurations that can be utilized dependent upon whether the operational logic and electrical resistance is provided from an external sequencer or by circuit board mounted elements. While the preferable method of mounting is via mechanical fasteners through orifices in the base, adhesive strips, glue, magnets, suction cups and panel clips may be substituted.

The above description will enable any person skilled in the art to make and use this invention. It also sets forth the best modes for carrying out this invention. There are numerous variations and modifications thereof that will also remain readily apparent to others skilled in the art, now that the general principles of the present invention have been disclosed. It is important, therefore, that the claims be regarded as including such equivalent constructions insofar as they do not depart from the spirit and scope of the present invention.

What is claimed is:

1. A visual alert system for mounting on the hood of a police vehicle comprising
    an irregular, nonequilateral, nonequiangular, planar polygonal top plate with a first, multi-sided periphery;
    an irregular, nonequilateral, nonequiangular, concave polygonal bottom plate with a second, multi sided periphery, and that is matingly conformed to a contour of said police vehicle hood;
    a front circuit board having an arced longitudinal edge and wherein said front circuit board has a reflective outer surface and houses at least one linear array of electrically connected light emitting diodes thereon;
    at least two side circuit boards tapered along a longitudinal axis and having a top and a bottom longitudinal edge and wherein said side circuit boards have a reflective outer surface and houses at least one linear array of electrically connected light emitting diodes thereon;
    at least one horizontal array of electrically connected light emitting diodes on said front and side circuit boards;
    at least one current limiting resistor;
    an electrical power connector; and
    an attachment device to attach said bottom plate to said hood;
    wherein said bottom plate is attached to said hood by said attachment device and has the identical polygonal configuration of said top plate but is dimensionally larger than said top plate, and wherein said top plate and said bottom plate are held in an angular, spaced proximity to each other by a connected, continuous single row ring, of said circuit boards arranged such that their top longitudinal edges form the identical polygonal configuration and size of said top plate and their bottom longitudinal edges form the identical polygonal configuration and size of said bottom plate, and which are each affixed at said top longitudinal edge to said top plate and affixed at said bottom longitudinal edge to said bottom plate, and wherein said light emitting diodes receive electrical power through said power connector and are restricted to a limited current by said limiting resistor which is mounted on one of said circuit boards.

2. The visual alert system of claim 1 further comprising
    a microprocessor logic control unit mounted on one of said circuit boards wherein said microprocessor logic control unit sequentially operates said light emitting diodes to produce a pattern of light emission selected from the group of light patterns consisting of solid, stroboscopic, revolving, flashing, modulated, pulsing, oscillating, bursts or alternating patterns of light emission;
    a vehicle master sequencer to provide said power to microprocessor logic control unit; and wherein said power is provided to said master sequencer that when activated provides power to said microprocessor logic control unit and wherein said attachment device is an adhesive strip affixed to a bottom side of said polygonal bottom plate and to said vehicle hood; and wherein the total number of sides is eight.

3. The visual alert system of claim 2 wherein the number of side circuit boards of said light emitting diode unit is four and said planar polygonal top plate and concave polygonal bottom plate have a five sided periphery.

4. The visual alert system of claim 3 further comprising a lens cover that resides parallel to said circuit boards and has an outer surface and an inner surface with small concave formations on said inner surface so as to form a dimpled configuration adapted for diffusing light.

5. A vehicular hood mounted, tapered, light comprising;
    an irregular, nonequilateral, nonequiangular, hexagonal planar top plate;
    an irregular, nonequilateral, nonequiangular, convex hexagonal bottom plate;
    a contoured front circuit board having a first top longitudinal edge and a first bottom longitudinal edge, and at least two longitudinally tapered side circuit boards having a second top longitudinal edge and a second bottom longitudinal edge;
    a horizontal array of electrically connected light emitting diodes on said front and side circuit boards;
    at least one current limiting resistor;
    a logic module to operate said light; and
    an electrical power connector;
    wherein said bottom plate is geometrically identical but dimensionally larger than said top plate, and wherein said top plate and said bottom plate are held in a spaced angular configuration from each other by a connected single row ring of said circuit boards wherein said first and second top longitudinal edges are affixed to said top plate and said first and second longitudinal bottom edges are affixed to said bottom plate so as to form an obtuse contained angle between said top plate and said circuit board and an acute contained angle between said bottom plate and said circuit board that is between 20 and 60 degrees, and wherein said light emitting diodes are located so as to emit light toward an exterior periphery of said top plate and said light emitting diodes receive electrical power through said power connector and are restricted to a limited current by said resistor which is mounted on one of said circuit boards.

6. The vehicular hood mounted, light of claim 5 further comprising:
    4 side circuit boards;
    a rear mounting strip; and
    a microprocessor mounted on one of said circuit boards;
    wherein said array of circuit boards is a connected, closed array, and said light has an eight sided, irregular, octahedron, three dimensional, geometrical configuration, wherein said microprocessor sequentially operates said light emitting diodes to produce a pattern of light emission selected from the group of light patterns consisting of solid, stroboscopic, revolving, flashing, modulated, pulsing, oscillating, bursts or alternating patterns of light emission, and said mounting strip adhesively affixes said vehicular light to said vehicular hood.

7. The vehicular hood mounted, light of claim 6 further comprising a clear lens cover affixed to said bottom plate and extending in front of said circuit boards wherein said lens cover has an outer surface and an inner surface with small concave formations on said inner surface so as to form a dimpled configuration adapted for diffusing light.

8. The vehicular hood mounted, light of claim 7 wherein said side circuit boards have a reflective outer surface, and wherein said acute contained angle is an angle between 20 and 60 degrees and wherein said clear lens cover is selected from the group of clear lens covers consisting of red, blue, yellow, amber, green, orange and white colored lenses.

\* \* \* \* \*